(12) United States Patent
Kuromizu

(10) Patent No.: US 10,031,273 B2
(45) Date of Patent: Jul. 24, 2018

(54) LIGHT SOURCE DEVICE AND DISPLAY APPARATUS

(71) Applicant: Sakai Display Products Corporation, Sakai-shi, Osaka (JP)

(72) Inventor: Yasumori Kuromizu, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 14/912,393

(22) PCT Filed: Aug. 20, 2013

(86) PCT No.: PCT/JP2013/072199
§ 371 (c)(1),
(2) Date: Feb. 16, 2016

(87) PCT Pub. No.: WO2015/025364
PCT Pub. Date: Feb. 26, 2015

(65) Prior Publication Data
US 2016/0209573 A1    Jul. 21, 2016

(51) Int. Cl.
*F21V 8/00*    (2006.01)

(52) U.S. Cl.
CPC ......... *G02B 6/0031* (2013.01); *G02B 6/0033* (2013.01); *G02B 6/0055* (2013.01); *G02B 6/0088* (2013.01)

(58) Field of Classification Search
CPC .................................................. G02B 6/0061
USPC ....................................................... 362/215
See application file for complete search history.

(56) References Cited

U.S. PATENT DOCUMENTS

| | | | | |
|---|---|---|---|---|
| 2010/0277664 A1* | 11/2010 | Kim | ..................... | G02B 6/0085 349/58 |
| 2011/0292320 A1 | 12/2011 | Yu et al. | | |
| 2013/0088893 A1* | 4/2013 | Gotou | .................... | F21V 21/00 362/632 |
| 2013/0201428 A1* | 8/2013 | Ohfuku | ................ | G02B 6/0055 349/65 |
| 2014/0168573 A1* | 6/2014 | Park | ....................... | G02B 6/009 349/62 |

FOREIGN PATENT DOCUMENTS

| | | | |
|---|---|---|---|
| CN | 102182969 A | * | 9/2011 |
| CN | 103244867 A | | 8/2013 |

(Continued)

*Primary Examiner* — Elmito Breval
*Assistant Examiner* — Keith Delahoussaye
(74) *Attorney, Agent, or Firm* — Rudy J. Ng; Bret E. Field; Bozicevic, Field & Francis LLP

(57) ABSTRACT

A light source device including a light guide plate which has notches formed at edge parts thereof and emits light from one surface thereof, the light having entered a side face of the light guide plate, and a reflection sheet member which is disposed to face the light guide plate and has concave parts corresponding to the notches at edge parts thereof is disclosed. And the light source device is provided with edge part frame members on the edge part side of the one surface of the light guide plate at an interval in an emitting direction of light from the one surface, and the entirety of light amount at the edge parts of the light guide plate is increased by reflecting the light emitted from the edge parts of the one surface of the light guide plate to the one surface.

12 Claims, 11 Drawing Sheets

(56) References Cited

FOREIGN PATENT DOCUMENTS

| | | | |
|---|---|---|---|
| JP | 2005-228540 | A | 8/2005 |
| JP | 2008-166200 | A | 7/2008 |
| JP | 2011-249332 | A | 12/2011 |
| JP | 2012-084303 | A | 4/2012 |
| JP | 2012084303 | A * | 4/2012 |

* cited by examiner

F I G. 5
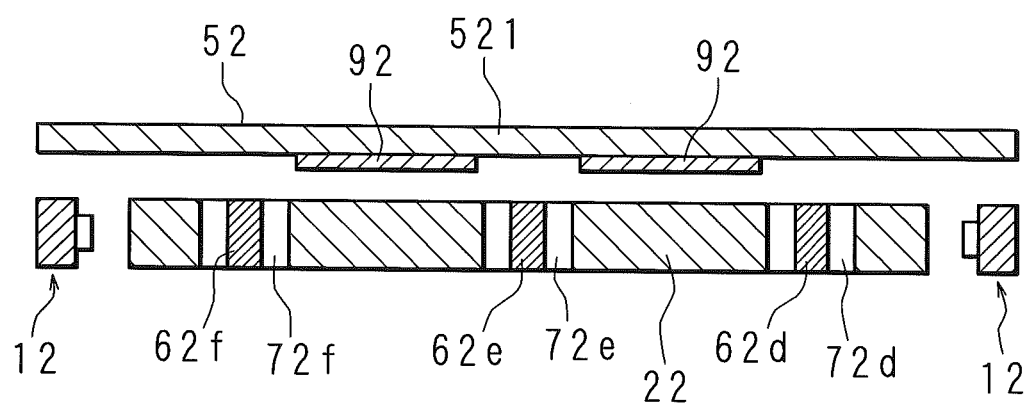

LIGHT SOURCE DEVICE AND DISPLAY APPARATUS

This application is the national phase under 35 U.S.C. § 371 of PCT International Application No. PCT/JP2013/072199 which has an International filing date of Aug. 20, 2013 and designated the United States of America.

BACKGROUND

Technical Field

The present invention relates to a light source device including a light guide plate which has notches formed at an edge part thereof and emits light entering a side face from one surface thereof, and a reflection sheet which is disposed to face the light guide plate and has concave parts corresponding to the notches at an edge part thereof, and a display apparatus.

Description of Related Art

Recently, display apparatuses such as a liquid crystal television have been widely distributed. Such display apparatuses include a light guide plate, and the light guide plate planarly propagates a light from a light source inside there and irradiates the light to a display panel which displays an image. Meanwhile, it is necessary to prevent a position shift of the light guide plate in order to properly irradiate the display panel with the light. In general, the position of the light guide plate is fixed by using positioning parts, and the light guide plate has notches formed at positions corresponding to the positioning parts.

However, as described above, when fixing the position of the light guide plate by using the positioning parts, the light propagating inside the light guide plate, for example, is reflected by the positioning parts, such that unintended reflected light is generated around the notches to be emitted to the display panel through the light guide plate, or reflectance of light is changed around portions relating to the notches.

Thereby, unevenness in luminance occurs in the display panel.

To solve the above-described problems, Japanese Patent Laid-open Publication No. 2012-84303 discloses a light source module in which positioning parts are covered with a covering film having a lower reflectance with respect to the light from the light source than that of the positioning part itself, thereby preventing an occurrence of unevenness in luminance due to reflection around notches of the light guide plate.

SUMMARY

Meanwhile, light hits side faces of the notches of the light guide plate, not the positioning parts, and thereby unevenness in luminance may occur. That is, when irregular reflection is generated due to the light being hit to the side faces relating to the notches of the light guide plate, bright-part unevenness occurs around the notches, which is viewed by a user as the unevenness in luminance. However, it is not possible to solve the above-described problems in the light source module of Japanese Patent Laid-open Publication No. 2012-84303.

In consideration of the above-mentioned circumstances, it is an object of the present invention to provide a light source device including a light guide plate which has notches formed at an edge part thereof and emits light from one surface thereof, the light having entered a side face of the light guide plate, and a reflection sheet member which is disposed to face the light guide plate and has concave parts corresponding to the notches at an edge part thereof, wherein the light source device is provided with an edge part frame member on the edge part side of the one surface of the light guide plate, and the edge part frame member has reflection surface at one surface thereof on the light guide plate side, and light emitted from the edge part of the one surface of the light guide plate is reflected to the one surface, such that it is possible to suppress an occurrence of unevenness in luminance by increasing the entirety of light amount at the edge part of the light guide plate, and prevent the unevenness in luminance from being viewed by a user, and a display apparatus including the light source device.

According to one embodiment of the present invention, there is provided a light source device which includes a light guide plate which has notches formed at an edge part thereof and emits light from one surface thereof, the light having entered a side face of the light guide plate, and a reflection sheet member which is disposed to face the light guide plate and has concave parts corresponding to the notches at an edge part thereof, the light source device including: an edge part frame member which is provided on the edge part side of the one surface of the light guide plate, wherein the edge part frame member has reflection surface at one surface thereof on the light guide plate side.

According to the embodiment of the present invention, the edge part frame member has the reflection surface, and light emitted from the edge part of the one surface of the light guide plate is reflected to the one surface, such that the entirety of light amount at the edge part of the light guide plate is increased.

In the light source device according to the embodiment of the present invention, it is preferred that the reflection surface is formed at a portion other than positions corresponding to the notches of the light guide plate in the facing direction.

According to the preferred embodiment of the present invention, since irregular reflection of light occurs at the side face relating to the notches and the luminance is increased, the reflection surface is formed at the portions other than the positions corresponding to the notches in the facing direction, thereby increasing the light amount at these portions.

In the light source device according to the embodiment of the present invention, the light guide plate may be a rectangular shape, in this case, it is preferred that a light source facing the side face is provided adjacent to the edge part of the light guide plate, and the reflection surface is configured so that an area thereof is gradually decreased toward the light source.

According to the present embodiment, the area of the reflection surface is gradually decreased toward the light source provided adjacent to the edge part of the light guide plate, and in the vicinity of the light source already having high luminance, an increase in the light amount due to the reflection is restrained.

In the light source device according to the embodiment of the present invention, the reflection surface may be a substantially triangular shape.

According to the present embodiment, the reflection surface is formed in a substantially triangular shape, such that the area of the reflection surface is gradually decreased toward the light source.

In the light source device according to the embodiment of the present invention, the reflection surface may be configured so that an area thereof is gradually decreased toward the notches of the light guide plate.

According to the present embodiment, the area of the reflection surface is gradually decreased toward the notches of the light guide plate, and in the vicinity of the notches already having high luminance by the irregular reflection, an increase in the light amount due to the reflection is restrained.

In the light source device according to the embodiment of the present invention, the reflection surface may be a substantially rhombic shape.

According to the present embodiment, the reflection surface is formed in a substantially rhombic shape, such that the area of the reflection surface is gradually decreased toward the notches of both end sides of the reflection surface.

In the light source device according to the embodiment of the present invention, highly reflective dots may be printed on the reflection surface.

According to the present embodiment, highly reflective dots having a high reflectivity are printed on the reflection surface, and the highly reflective dots reflect the light emitted from the edge part of the one surface of the light guide plate to the one surface, thereby increasing the light amount at the edge parts of the light guide plate.

In the light source device according to the embodiment of the present invention, the reflection surface may be configured so that a dot density of the highly reflective dots is gradually decreased toward the notches of the light guide plate.

According to the present embodiment, the density of each dot of the highly reflective dots is gradually decreased toward the notches of the light guide plate, and in the vicinity of the notches already having high luminance, an increase in the light amount due to the reflection is restrained.

In the light source device according to the embodiment of the present invention, the highly reflective dots may have a constant distribution, and the reflection surface is configured so that each area of the highly reflective dots is gradually decreased toward the notches of the light guide plate.

According to the present embodiment, the area of each dot of the highly reflective dots is gradually decreased toward the notches, and in the vicinity of the notches already having high luminance, an increase in the light amount due to the reflection is restrained.

In the light source device according to the embodiment of the present invention, each dot of the highly reflective dots may have a constant shape, and the reflection surface is configured so that an interval between the dots of the highly reflective dots is gradually increased toward the notches of the light guide plate.

According to the present embodiment, the interval between the dots of the highly reflective dots is gradually increased toward the notches, and in the vicinity of the notches already having high luminance, an increase in the light amount due to the reflection is restrained.

In the light source device according to the embodiment of the present invention, the reflection surface may be formed by attaching a reflection sheet thereto.

According to the present embodiment, a prescribed reflection sheet member is attached to the reflection surface, and the reflection sheet member reflects the light emitted from the edge part of the one surface of the light guide plate to the one surface, thereby increasing the light amount at the edge part of the light guide plate.

In the light source device according to the embodiment of the present invention, in the side faces of the light guide plate other than the side face facing the light source, portions where the notches are not formed may have reflective sheets attached thereto to reflect light emitted through the side faces of the light guide plate to a direction opposite to the emission.

According to the present embodiment, the reflective sheet reflects the light emitted through the side face of the light guide plate to the direction opposite to the emission, that is, inside of the light guide plate, thereby increasing the light amount around the notches.

In the light source device according to the embodiment of the present invention, a portion facing an incident direction of light from the light source among side face portions forming the notch may be treated to mirror-finishing.

According to the present embodiment, the irregular reflection at the portion facing the incident direction of light from the light source among the side face portions forming the notches is suppressed, thereby decreasing the light amount at the notches.

In the light source device according to the embodiment of the present invention, in the side faces of the light guide plate other than the side face facing the light source, portions where the notches are not formed may not be treated to the mirror-finishing.

According to the present embodiment, the irregular reflection is generated at the portions where the notches are not formed in the side faces of the light guide plate other than the side face facing the light source, thereby increasing the light amount around the notches.

According to one embodiment of the present invention, it is preferred that there is provided a display apparatus comprising: the light source device according to the above-described invention; and a display panel which is provided on the one surface side of the light guide plate, and displays an image using light entering thereto through the light guide plate.

According to the preferred embodiment of the present invention, the display panel displays a prescribed image using the light which is emitted from the one surface of the light guide plate of the light source device and enters the display panel.

According to the present invention, it is possible to suppress an occurrence of unevenness in luminance by increasing the light amount at the edge part of the light guide plate, prevent the unevenness in luminance from being viewed by a user, and obtain good display quality.

The above and further objects and features will move fully be apparent from the following detailed description with accompanying drawings.

BRIEF DESCRIPTION OF THE SEVERAL VIEWS OF THE DRAWINGS

FIG. 5 is a cross-sectional view schematically illustrating a cross-section taken on line A-A of FIG. 4.

DETAILED DESCRIPTION

Figure 1:
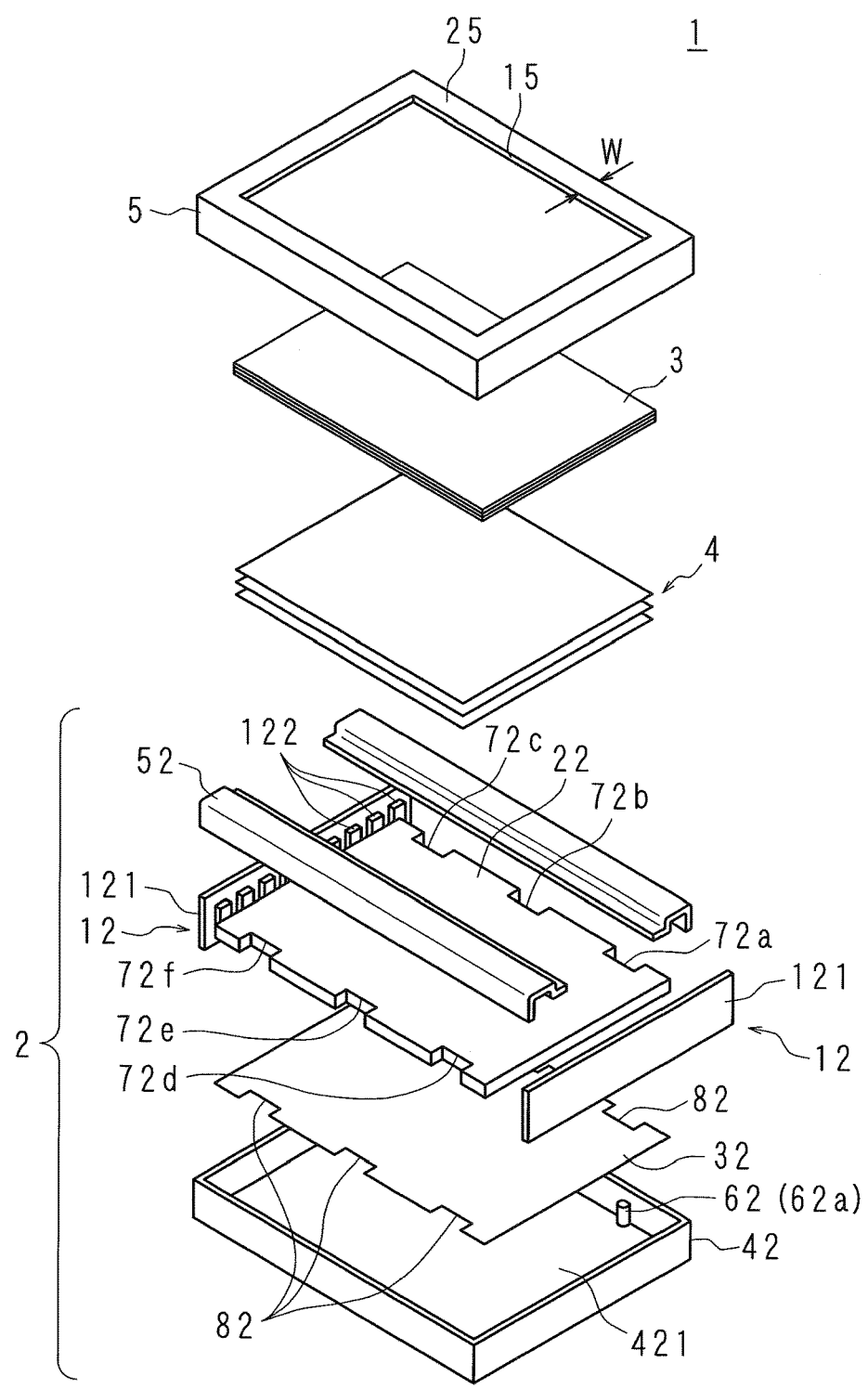
FIG. 1 is an exploded perspective view illustrating a configuration of main components of a liquid crystal television according to Embodiment 1 of the present invention.

Hereinafter, embodiments of the present invention will be described with reference to the accompanying drawings, but the present invention is not limited to the embodiments disclosed below. In the drawings to be described below, parts having the same function as each other will be denoted by the same reference numerals, and will not be repeatedly described.

Embodiment 1

FIG. 1 is an exploded perspective view illustrating a configuration of main components of a liquid crystal television according to Embodiment 1 of the present invention. FIG. 1 illustrates a liquid crystal television 1. As illustrated in FIG. 1, the liquid crystal television 1 includes a light source device 2, a liquid crystal display panel 3, an optical sheet 4, a front housing part 5 which houses the liquid crystal display panel 3 and the optical sheet 4 and the like.

Further, the light source device 2 has light source units 12, a light guide plate 22 which guides light entering thereto from the light source units 12 to one surface thereof on the liquid crystal display panel 3 side, a reflection sheet 32 which is disposed to face the light guide plate 22 and reflects the light made incident thereon from the light source units 12 toward the one surface of the light guide plate 22, a back housing part 42 which house the light source units 12, the light guide plate 22 and the reflection sheet 32, and light guide plate pressing members 52 and 52 for limiting an movement of the light guide plate 22.

Hereinafter, for the convenience of explanation, a long-side direction and a short-side direction of the liquid crystal display panel 3, which is a rectangular shape, are referred to as a lateral direction and a longitudinal direction, respectively.

Figure 2:
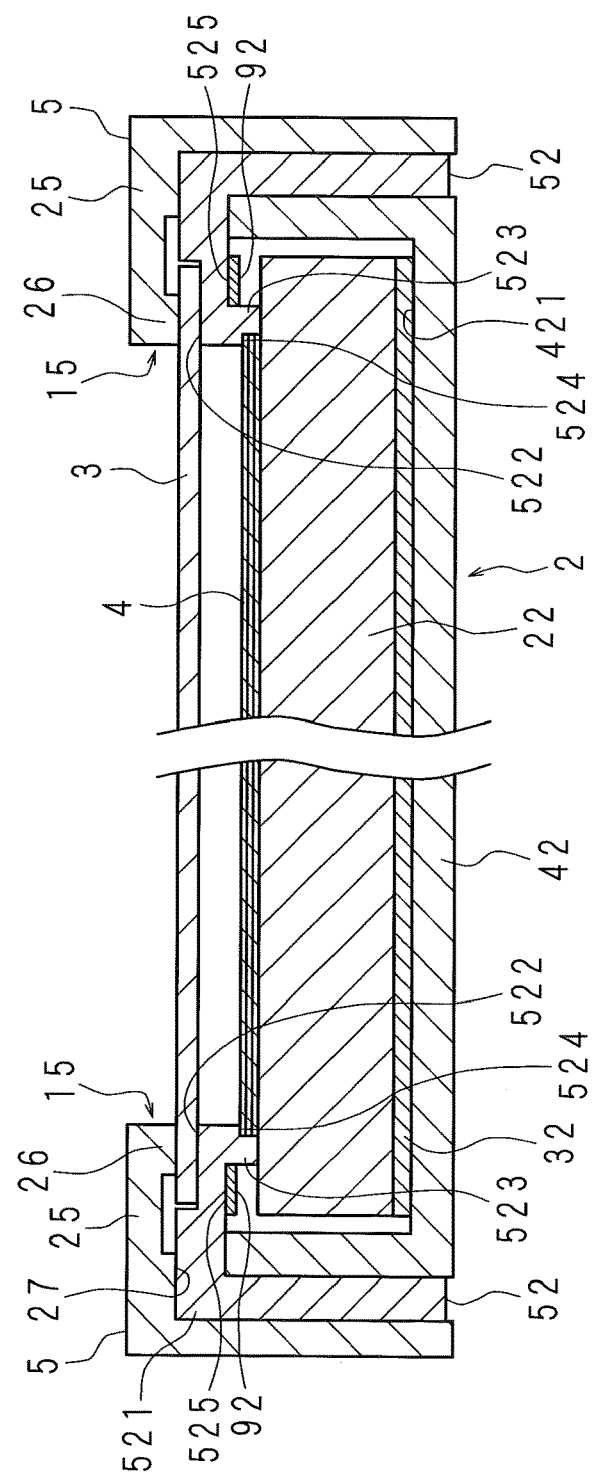
FIG. 2 is a longitudinal-sectional view illustrating the configuration of the main components of the liquid crystal television according to Embodiment 1 of the present invention.
Figure 3:
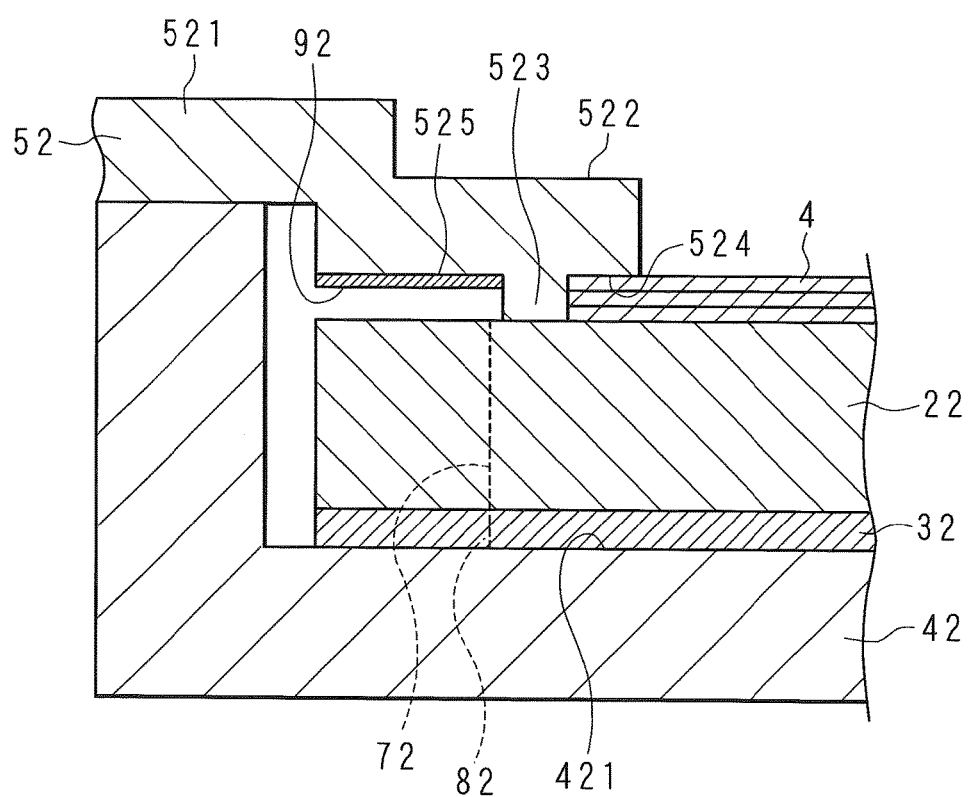
FIG. 3 is an enlarged view illustrating one end part of the liquid crystal television of FIG. 2, while a part thereof is not illustrated.

FIG. 2 is a longitudinal-sectional view illustrating the configuration of the main components of the liquid crystal television 1 according to Embodiment 1 of the present invention, and FIG. 3 is an enlarged view illustrating one end part of the liquid crystal television of FIG. 2, while a part thereof is not illustrated.

The front housing part 5 is disposed on a front side from one surface of the liquid crystal display panel 3 on which an image is displayed. The front housing part 5 is formed in a cylindrical shape having a rectangular bottom copying the shape of the one surface of the liquid crystal display panel 3 viewed from a user, and has a rectangular display window 15 which is opened in the bottom thereof. The user may view the image displayed on the one surface of the liquid crystal display panel 3 through the display window 15.

Further, portions between edges of the bottom of the front housing part 5 and edges of the display window 15 have a prescribed width. In other words, in the bottom of the front housing part 5, residual portions other than the display window 15 are formed as a hollow rectangular frame part 25. Peripheral edge parts of the one surface of the liquid crystal display panel 3 are covered with the frame part 25. The liquid crystal display panel 3 is provided with the optical sheet 4 on the other surface which is opposite to the one surface, and the optical sheet 4 is disposed so that one surface thereof faces the other surface of the liquid crystal display panel 3.

The liquid crystal display panel 3, which is a rectangular shape, is an active matrix type, for example, and includes transparent substrates which are disposed to face each other at a prescribed gap. Liquid crystal is sealed in the gap between these transparent substrates. The liquid crystal display panel 3 is provided with a polarizing plate (not illustrated) on the other surface thereof.

The frame part 25 is provided with panel pressing part 26 which protrudes in a thickness direction of the liquid crystal display panel 3 on a rear side thereof along the edge thereof on the display window 15 side, and abuts the peripheral edge part of the liquid crystal display panel 3 to push down the same. That is, the panel pressing part 26 hold the liquid crystal display panel 3 by pressing the peripheral edge part of the liquid crystal display panel 3 to the light guide plate pressing member 52 to be described below.

In addition, the liquid crystal display panel 3 is provided with the polarizing plate (not illustrated) on the other surface thereof, and is configured so that light entering thereto by using the polarizing plate is separated into P-waves (horizontal polarizing component) and S-waves (vertical polarizing component), then only the P-waves are transmitted toward the one surface, and the S-waves are absorbed by the polarizing plate. The liquid crystal display panel 3 may be an electrophoresis liquid crystal panel, for example.

In addition, the frame part 25 is provided with abutting surfaces 27 which are formed with a prescribed step on the rear side thereof and a side opposite to the panel pressing part 26, so as to abut the light guide plate pressing members 52 and 52.

The light guide plate pressing members 52 and 52 are provided on the other surface side of the liquid crystal display panel 3, which abut a long-side edge part of the other surface of the liquid crystal display panel 3 to support the liquid crystal display panel 3. As described above, the panel pressing parts 26 press the long-side edge part of the liquid crystal display panel 3 to the light guide plate pressing member 52 side, and the liquid crystal display panel 3 is pinched by the panel pressing parts 26 and the light guide plate pressing member 52.

In addition, the light guide plate pressing members 52 and 52 are formed in a bent plate shape which is formed in an L shape in a cross-sectional view, and are disposed so as to cover the edge parts of both long-sides of rectangular light guide plate 22. The light guide plate pressing members 52 and 52 limit a movement of the light guide plate 22 in a direction in which the light guide plate 22 and the reflection sheet 32 face each other.

The light guide plate pressing members 52 and 52 have abutting part 521 which abut the edge parts of the other surface of the liquid crystal display panel 3 and the abutting surfaces 27 of the front housing part 5. The abutting part 521 are formed in a strip shape, have a dimension in the long-side direction slightly larger than the dimension of the long-side of the light guide plate 22, and is provided with step 522 at central part thereof in the short-side direction.

The step 522 has a shape copying the long-side edge part of the liquid crystal display panel 3. The long-side edge part of the liquid crystal display panel 3 are placed on the step 522 to be held with abutting the steps 522.

In addition, the abutting part 521 is provided with side wall on one end side thereof, which extend in the thickness direction of the light guide plate 22. Further, the abutting part 521 is provided with sheet pressing part 523 which protrudes in the thickness direction of the optical sheet 4 on a rear side of the other end part of the light guide plate 22 along the edge thereof, and abuts and pushes down the edge part of the optical sheet 4 to hold the optical sheet 4, the light guide plate 22 and the reflection sheet 32. The sheet pressing part 523 has cutout part 524 which is formed at an end part thereof and have a shape copying the end part of the one surface of the optical sheet 4 in the long-side direction thereof, and the edge part of the one surface of the optical sheet 4 abuts the cutout part 524. Thereby, the sheet pressing part 523 hold the optical sheet 4, the light guide plate 22 and the reflection sheet 32 by pressing the edge part of the optical sheet 4 to the back housing part 42 side.

Reflection part 525 is formed on the rear surface of the abutting part 521 and on a side opposite to the cutout part 524 with respect to the sheet pressing part 523. The reflection part 525 is within a range matching with the long-side edge part of the light guide plate 22 in the thickness direction of the light guide plate 22, in other words, in the direction in which the light guide plate 22 and the reflection sheet 32 face each other.

In the reflection part 525, reflection surfaces 92 are formed at a plurality of places on both end sides near the light source units 12, and at portions other than the positions corresponding to each notch 72 to be described below in the direction in which the light guide plate 22 and the reflection sheet 32 face each other. As such, each reflection surface 92 reflects light, which is emitted from the long-side edge parts of the light guide plate 22 toward the liquid crystal display panel 3, toward the long-side edge parts of the light guide plate 22.

In more detail, the reflection surfaces 92, 92, . . . and 92 are formed at portions corresponding between the notch 72 and the notch 72 of the light guide plate 22, in the direction in which the light guide plate 22 and the reflection sheet 32 face each other, and are formed in a strip shape in which a direction along the long-side of the light guide plate 22 is set to be the long-side direction. In other words, the dimension of each reflection surface 92 in the long-side direction thereof is the same as a distance between the notches 72. In addition, the reflection surfaces 92, 92, . . . and 92 may be provided by attaching the reflection sheet, or applying a material having excellent reflecting properties thereto.

The optical sheet 4 is a publicly known sheet which functions to diffuse and collect, etc., light emitted from the light source units 12 and entering thereto through the light guide plate 22, so as to more uniformly emit light toward the liquid crystal display panel 3. For example, the optical sheet 4 includes two diffusion sheets, and one prism sheet, wherein the prism sheet is installed between the two diffusion sheets.

One diffusion sheet of the two diffusion sheets, which is disposed on the light guide plate 22 side, is an optical sheet which functions to diffuse light entering thereto from the light source unit 12 through the light guide plate 22 and allow it to enter the prism sheet. In addition, the prism sheet is an optical sheet which functions to collect the light entering thereto through the one diffusion sheet and emit it toward the other diffusion sheet. The light passing through the prism sheet enters the other diffusion sheet perpendicular to the prism sheet.

The other diffusion sheet disposed on the liquid crystal display panel 3 side is an optical sheet which functions to again diffuse the light entering thereto through the prism sheet and emit it toward the liquid crystal display panel 3 with a more uniform luminance distribution.

The rectangular light guide plate 22 is disposed on the other surface of the optical sheet 4, as described above. The other surface of the optical sheet 4 is opposite to the one surface thereof. The light guide plate 22 guides light emitted by the light source unit 12 to the optical sheet 4 (liquid crystal display panel 3). For example, the light guide plate 22 may be configured in such a manner that one surface thereof facing the other surface of the optical sheet 4 has an emitting surface on which a pattern is formed so that the light entering thereto from the light source unit 12 advances in the liquid crystal display panel 3 direction. Thereby, the light guide plate 22 may convert the light entering thereto from the light source unit 12 into flat light to uniformly transmit it to the optical sheet 4 through the emitting surface.

The light guide plate 22 is made of a high transparency acrylic resin, for example, and the reflection sheet 32 is disposed on the other surface side of the light guide plate 22 to irregularly reflect the light made incident thereon from the light source units 12, thereby emitting the incident light from the emitting surface of the light guide plate 22. The other surface of the light guide plate 22 is opposite to the one surface thereof.

In addition, the light guide plate 22 has notches 72a, 72b, 72c, 72d, 72e and 72f (hereinafter, referred to as the notches 72) formed in both long-side edge parts corresponding to a plurality of positioning parts 62a, 62b, 62c, 62d, 62e and 62f (hereinafter, referred to as positioning parts 62) provided on the back housing part 42 to be described below. For example, the notches 72a, 72b, 72c, 72d, 72e and 72f are formed at both ends and a center of the respective long-side edge part of the light guide plate 22, and formed in a U shape in the thickness direction of the light guide plate 22.

Mirror-finishing is executed on each side face of four sides of the light guide plate 22 other than side faces relating to the notches 72, and a part of the light emitted from the light source units 12 freely passes through the side faces to an outside. Meanwhile, the mirror-finishing is not executed on the side faces relating to the notches 72, and a part of the light, which is emitted from the light source units 12 and hits the side faces relating to the notches 72, causes irregular reflection on the side faces.

Meanwhile, the reflection sheet 32 is formed in a rectangular shape having substantially the same dimensions as the light guide plate 22, and irregularly reflects the light made incident on the light guide plate 22 from the light source units 12 on the other surface side of the light guide plate 22 to emit the light through the emitting surface of the light guide plate 22.

In addition, similarly to the light guide plate 22, the reflection sheet 32 also has concave parts 82, 82, . . . and 82 formed on the respective long-side edge part thereof corresponding to the positioning parts 62a, 62b, 62c, 62d, 62e and 62f of the back housing part 42. For example, the concave parts 82, 82, . . . and 82 are formed in a U shape in the thickness direction of the reflection sheet 32.

Furthermore, the light guide plate 22 and the reflection sheet 32 are configured so that, during being housed in the back housing part 42, the positions of the notches 72a, 72b, 72c, 72d, 72e and 72f and the concave parts 82, 82, . . . and 82 match with each other in a direction in which these are laminated.

The light source units 12 are provided in the vicinity of both side faces of both short-sides of the light guide plate 22. The light source units 12 have substrates 121 and 121 which are disposed to face the both side faces of the light guide plate 22, and light sources 122, 122, . . . and 122 which are mounted on each substrate 121, and juxtaposed along the both side faces of the light guide plate 22. The light sources 122, 122, . . . and 122 may be, for example, a light emitting diode (LED), cold cathode fluorescent lamp (CCFL), hot cathode fluorescent lamp (HCFL), external electrode fluorescent lamp (EEFL) or the like.

The position of the light source unit 12 is not limited to the vicinity of the both side faces of the light guide plate 22, and may be provided in the vicinity of any one side face of the short-side. In addition, the light source unit 12 may be provided in the vicinity of the side faces of both long-sides, or may be provided in the vicinity of the side face of any one long-side. Further, the light source unit 12 may be configured to be provided at only one place, or provided at a plurality of places.

The back housing part 42 is formed in a cylindrical shape having a rectangular bottom 421 copying the shape of the reflection sheet 32, and has positioning parts 62 formed at a plurality of places to determine the positions of the light guide plate 22 and the reflection sheet 32 in the back housing part 42 during being housed therein. Each positioning part 62 is formed in a columnar shape whose central axis is parallel to the lamination direction, and is provided at inner side faces of the back housing part 42. The notches 72a, 72b, 72c, 72d, 72e and 72f of the light guide plate 22 and the concave parts 82, 82, . . . and 82 of the reflection sheet 32 are formed so as to correspond to the positioning parts 62a, 62b, 62c, 62d, 62e and 62f of the back housing part 42.

The light guide plate 22 and the reflection sheet 32 are housed in the back housing part 42 in a state in which the one surface of the reflection sheet 32 faces the other surface of the light guide plate 22, and the other surface of the reflection sheet 32 and the bottom 421 of the back housing part 42 face each other. The other surface of the reflection sheet 32 is opposite to the one surface thereof. In this case, as described above, the positions of the light guide plate 22 and the reflection sheet 32 during being housed in the back housing part 42 are determined by the positioning parts 62.

Since the liquid crystal television 1 according to Embodiment 1 of the present invention has the above configuration, it is possible to solve the problem in which bright-part unevenness in luminance of light occurs in the vicinity of the notches 72, or the problem in which, in order to conceal such the unevenness in luminance of light, it is necessary to widen a width in the frame part 25, and as a result, the display window 15 is narrowed, which will be described in detail below.

Light from the light source units 12 is reflected by the reflection sheet 32 toward the emitting surface of the light guide plate 22, but a part of the incident light passes through the side face of the light guide plate 22 to the outside. However, since the mirror-finishing is not executed on the side faces relating to the notches 72, if the light from the light source units 12 abuts the side faces of the notches 72, irregular reflection is generated at the side faces, and thereby the side faces of the notches 72 are brightly illuminated more than necessary. That is, the side faces relating to the notches 72 of the light guide plate 22 cause the irregular reflection of the incident light, while a portion along the side faces relating to the notches 72 exhibits a unnecessarily shine compared to the other portions of the light guide plate 22, and thereby so-called bright-part unevenness in luminance occurs.

Further, a part of the incident light passing through the side faces relating to the notches 72 to the outside is reflected by the positioning parts 62 and enters the side faces relating to the notches 72 again. Accordingly, the unevenness in luminance (bright-part) in the vicinity of the side faces relating to the notches 72 of the light guide plate 22 is further increased.

Thereby, when the light with the unevenness in luminance in the vicinity of the side faces relating to the notches 72 enters a so-called display region of the liquid crystal display panel 3, the unevenness in luminance is also generated in the display region of the liquid crystal display panel 3. Since such the unevenness in luminance provides an abnormal feeling to the user, in order to conceal such the unevenness in luminance, it is necessary to widen a width W in the frame part 25, and as a result, the display window 15 through which the image is displayed is narrowed.

Figure 4:
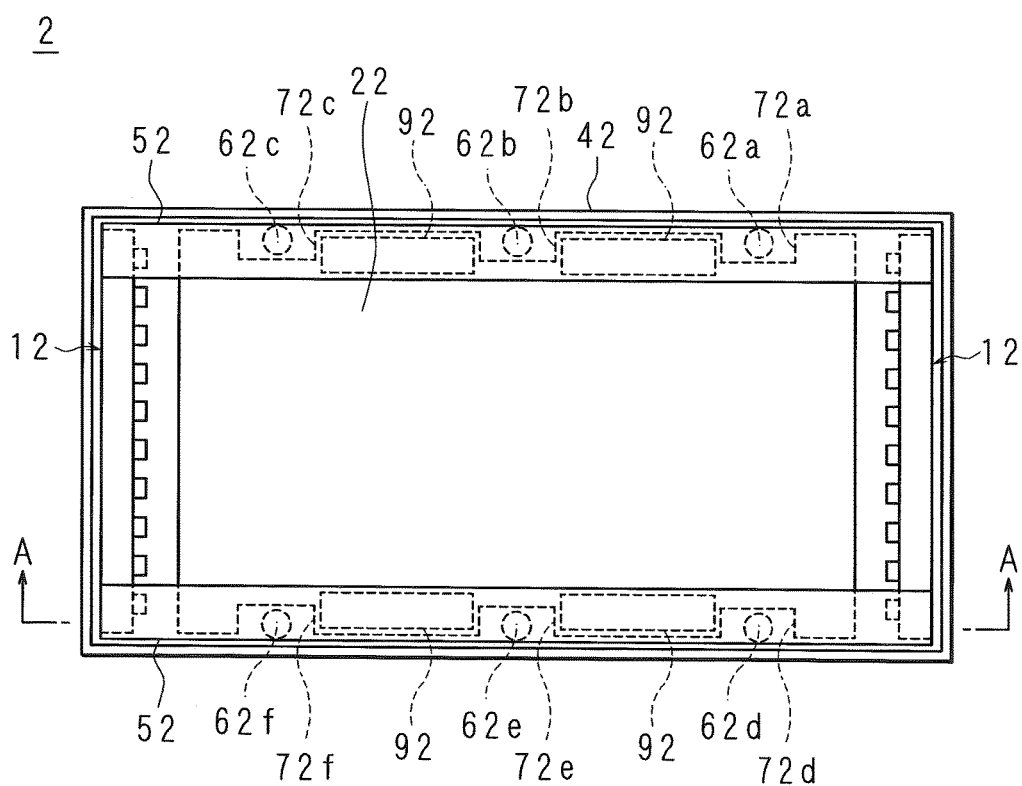
FIG. 4 is a schematic view describing a positional relation between light source units and notches of a light guide plate and reflection surfaces, in the liquid crystal television according to Embodiment 1 of the present invention.

Compared with this, in the liquid crystal television 1 according to Embodiment 1 of the present invention, the above-described problems may be solved by using the reflection surfaces 92, 92, . . . and 92. FIG. 4 is a schematic view describing a positional relation between the light source units 12 and the notches 72 of the light guide plate 22 and the reflection surfaces 92, 92, . . . and 92, in the liquid crystal television 1 according to Embodiment 1 of the present invention, and FIG. 5 is a cross-sectional view schematically illustrating a cross-section taken on line A-A of FIG. 4.

In the liquid crystal television 1 according to Embodiment 1 of the present invention, as described above, the strip-shaped reflection surfaces 92, 92, . . . and 92 are formed on the range matching with the both long-side edge parts of the light guide plate 22, at the portions other than the positions corresponding to both end sides near the light source units 12 and each notch 72 of the light guide plate 22, in the direction in which the light guide plate 22 and the reflection sheet 32 face each other.

As described above, the reflection surfaces 92, 92, . . . and 92 reflect the light, which is emitted from the long-side edge parts of the light guide plate 22 toward the liquid crystal display panel 3, toward the long-side edge parts of the light guide plate 22, such that the luminance (light amount) in the entirety of the long-side edge parts of the light guide plate 22 may be increased.

As a result, by suppressing the unevenness in luminance (bright-part) appearing in the vicinity of the side faces relating to the notches 72 of the light guide plate 22, the bright-part unevenness is no longer visible. Therefore, it is possible to solve the above-described problems and obtain good display quality, as well as, by narrowing the width W in the frame part 25, it is possible to expand the display window 15 (or the display region on which the image is displayed).

In the above description, the case in which each reflection surface 92 is provided in the light guide plate pressing member 52, so that the dimension of the reflection surface 92 in the long-side direction thereof is substantially the same as the distance between the notches 72 has been described, by way of an example, but the present invention is not limited thereto. For example, it may be configured in such a manner that, in the direction in which the light guide plate 22 and the reflection sheet 32 face each other, the end parts of the reflection surfaces 92 in the longitudinal direction thereof are overlapped with the notches 72, and it may be configured in such a manner that the dimensions of the reflection surfaces 92 in the longitudinal direction thereof are smaller than the distance between the notches 72.

Embodiment 2

In the liquid crystal television 1 according to Embodiment 1 of the present invention, the strip-shaped reflection surfaces 92, 92, . . . and 92 are formed on the range matching with the both long-side edge parts of the light guide plate 22, at the portions other than the positions corresponding to both end sides near the light source units 12 and each notch 72 of the light guide plate 22, in the direction in which the light guide plate 22 and the reflection sheet 32 face each other. However, a liquid crystal television 1 according to Embodiment 2 of the present invention is different from Embodiment 1 in terms of the shape of reflection surfaces 92, 92, . . . and 92.

In the liquid crystal television 1 according to Embodiment 2 of the present invention, the reflection surfaces 92, 92, . . . and 92 are configured so that an area thereof is gradually decreased toward the light source units 12 provided on both sides of the short-sides of the light guide plate 22.

Figure 6:
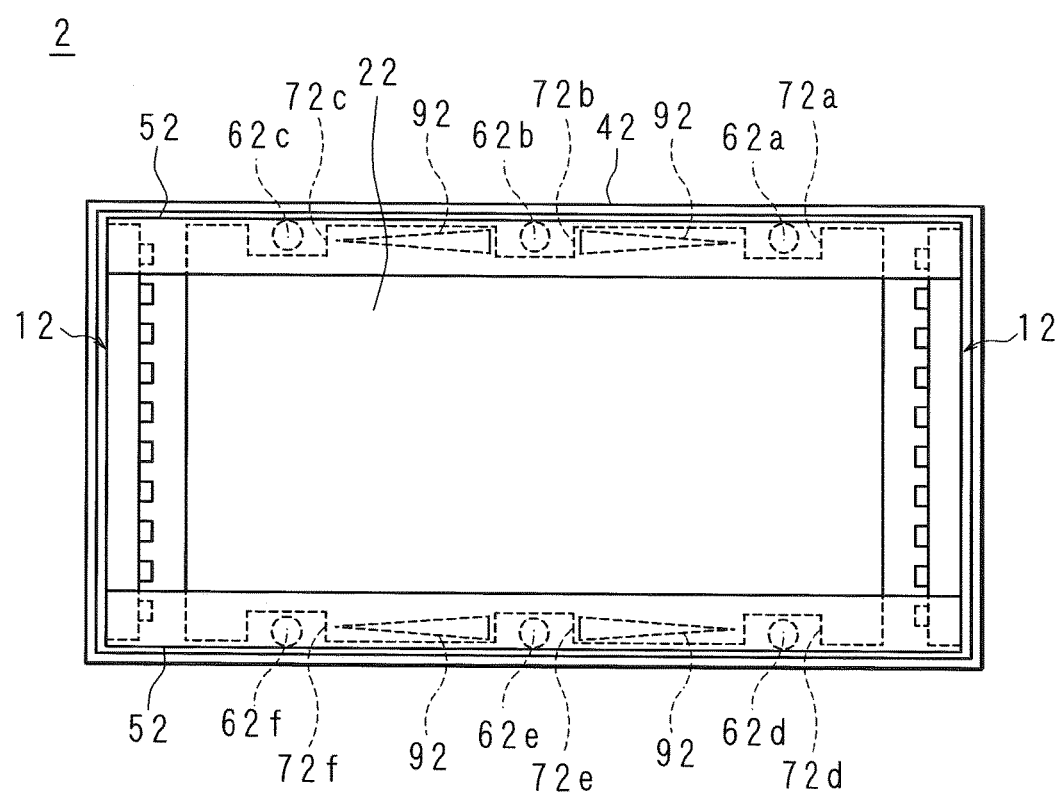
FIG. 6 is a schematic view describing a positional relation between the light source units and the notches of the light guide plate and reflection surfaces, in a liquid crystal television according to Embodiment 2 of the present invention.

FIG. 6 is a schematic view describing a positional relation between the light source units 12 and the notches 72 of the light guide plate 22 and the reflection surfaces 92, 92, . . . and 92, in the liquid crystal television 1 according to Embodiment 2 of the present invention. Each reflection surface 92 is formed in, for example, a substantially triangular shape, and more particularly, an isosceles triangular shape, and is configured so that an apex angle of the isosceles triangle is directed toward the light source units 12, and a base thereof faces a side opposite to the light source units 12.

In the liquid crystal television 1 according to Embodiment 2 of the present invention, the reflection surfaces 92, 92, . . . and 92 are formed on the range matching with the both long-side edge parts of the light guide plate 22, at the portions other than the positions corresponding to both end sides near the light source units 12 and each notch 72 of the light guide plate 22, in the direction in which the light guide plate 22 and the reflection sheet 32 face each other, so that the area thereof is gradually decreased toward the light source units 12 provided on both sides of the short-sides of the light guide plate 22.

The reflection surfaces 92, 92, . . . and 92 having the above shape may solve the above-described problems by providing a difference in the amount of reflected light, when reflecting the light, which is emitted from the long-side edge parts of the light guide plate 22 toward the liquid crystal display panel 3, toward the long-side edge parts of the light guide plate 22.

That is, since the amount of light is originally large in the vicinity of light source units 12, the light amount of brightness and darkness unevenness of the notches 72 (for example, 72a, 72c, 72d and 72f) in the vicinity of the light source units 12 is also large. Accordingly, since the light amount of the bright-part unevenness is relatively decreased in the notches 72 (for example, 72b and 72e) further away from the light source units 12, the reflection surfaces 92, 92, . . . and 92 increase the light amount.

As a result, by suppressing the unevenness in luminance (bright-part) appearing in the vicinity of the side faces relating to the notches 72 of the light guide plate 22, the bright-part unevenness is no longer visible. Therefore, it is possible to solve the above-described problems and obtain good display quality, as well as, by narrowing the width W in the frame part 25, it is possible to expand the display window 15 (or the display region on which the image is displayed).

The same parts as those in Embodiment 1 will be denoted by the same reference numerals, and will not be described in detail.

Embodiment 3

In the liquid crystal television 1 according to Embodiment 1 of the present invention, the strip-shaped reflection surfaces 92, 92, . . . and 92 are formed on the range matching with the both long-side edge parts of the light guide plate 22, at the portions other than the positions corresponding to both end sides near the light source units 12 and each notch 72 of the light guide plate 22, in the direction in which the light guide plate 22 and the reflection sheet 32 face each other. However, a liquid crystal television 1 according to Embodiment 3 of the present invention is different from Embodiments 1 and 2 in terms of the shape of reflection surfaces 92, 92, . . . and 92.

In the liquid crystal television 1 according to Embodiment 3 of the present invention, the reflection surfaces 92, 92, . . . and 92 are configured so that the area thereof is gradually decreased toward each notch 72.

Figure 7:
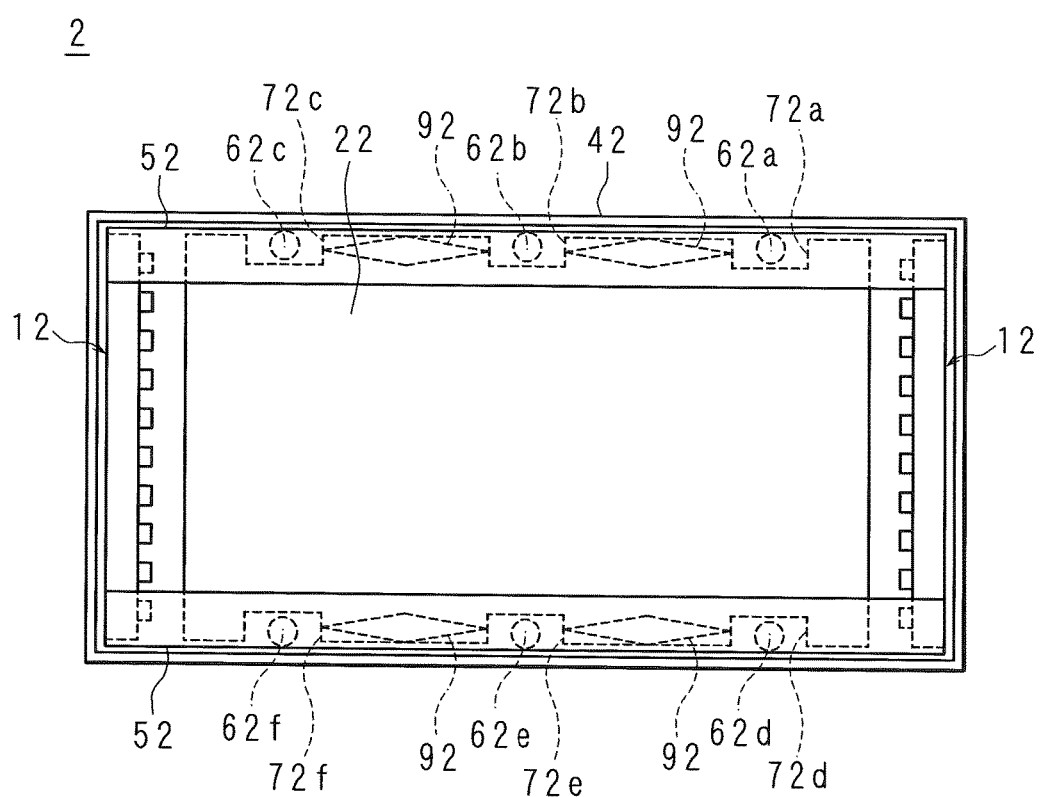
FIG. 7 is a schematic view describing a positional relation between the light source units and the notches of the light guide plate and reflection surfaces, in a liquid crystal television according to Embodiment 3 of the present invention.

FIG. 7 is a schematic view describing a positional relation between the light source units 12 and the notches 72 of the light guide plate 22 and the reflection surfaces 92, 92, . . . and 92, in the liquid crystal television 1 according to Embodiment 3 of the present invention. Each reflection surface 92 is formed in a substantially rhombus or rhombic shape, and is configured so that the area thereof is gradually decreased toward the notches 72 on both sides of the reflection surface 92.

In the liquid crystal television 1 according to Embodiment 3 of the present invention, the rhombic reflection surfaces 92, 92, . . . and 92 are formed on the range matching with the both long-side edge parts of the light guide plate 22, at the portions other than the positions corresponding to both end sides near the light source units 12 and each notch 72 of the light guide plate 22, in the direction in which the light guide plate 22 and the reflection sheet 32 face each other.

The reflection surfaces 92, 92, . . . and 92 having the above shape may solve the above-described problems by providing a difference in the amount of reflected light, when reflecting the light, which is emitted from the long-side edge parts of the light guide plate 22 toward the liquid crystal display panel 3, toward the long-side edge parts of the light guide plate 22.

That is, since a sufficient bright-part is already generated in the vicinity of the notches 72, an increment in the amount of light reflected by the reflection surfaces 92 in the vicinity of the notches 72 is decreased. Meanwhile, by increasing the increment in the amount of light reflected by the reflection surfaces 92 with being farther away from the notches 72, an occurrence of bright-part unevenness as described above is suppressed.

As a result, by suppressing the unevenness in luminance (bright-part) appearing in the vicinity of the side faces relating to the notches 72 of the light guide plate 22, the bright-part unevenness is no longer visible. Therefore, it is possible to solve the above-described problems and obtain good display quality, as well as, by narrowing the width W in the frame part 25, it is possible to expand the display window 15 (or the display region on which the image is displayed).

The same parts as those in Embodiment 1 will be denoted by the same reference numerals, and will not be described in detail.

Embodiment 4

In the liquid crystal television 1 according to Embodiment 1 of the present invention, the strip-shaped reflection surfaces 92, 92, . . . and 92 are formed on the range matching with the both long-side edge parts of the light guide plate 22, at the portions other than the positions corresponding to both end sides near the light source units 12 and each notch 72 of the light guide plate 22, in the direction in which the light guide plate 22 and the reflection sheet 32 face each other. However, a liquid crystal television 1 according to Embodiment 4 of the present invention is different from Embodiments 1 to 3 in terms of the shape of reflection surfaces 92, 92, . . . and 92.

In the liquid crystal television 1 according to Embodiment 4 of the present invention, highly reflective dots 102, 102, . . . and 102 made of, for example, titanium oxide, etc. are printed on the reflection surfaces 92, 92, . . . and 92. That is, the highly reflective dots 102, 102, . . . and 102 are printed in the area corresponding to the shape of the reflection surfaces 92, 92, . . . and 92 according to Embodiment 1, in other words, the reflection surfaces 92, 92, . . . and 92 have the highly reflective dots 102, 102, . . . and 102 attached to the reflection parts 52S.

Figure 8:
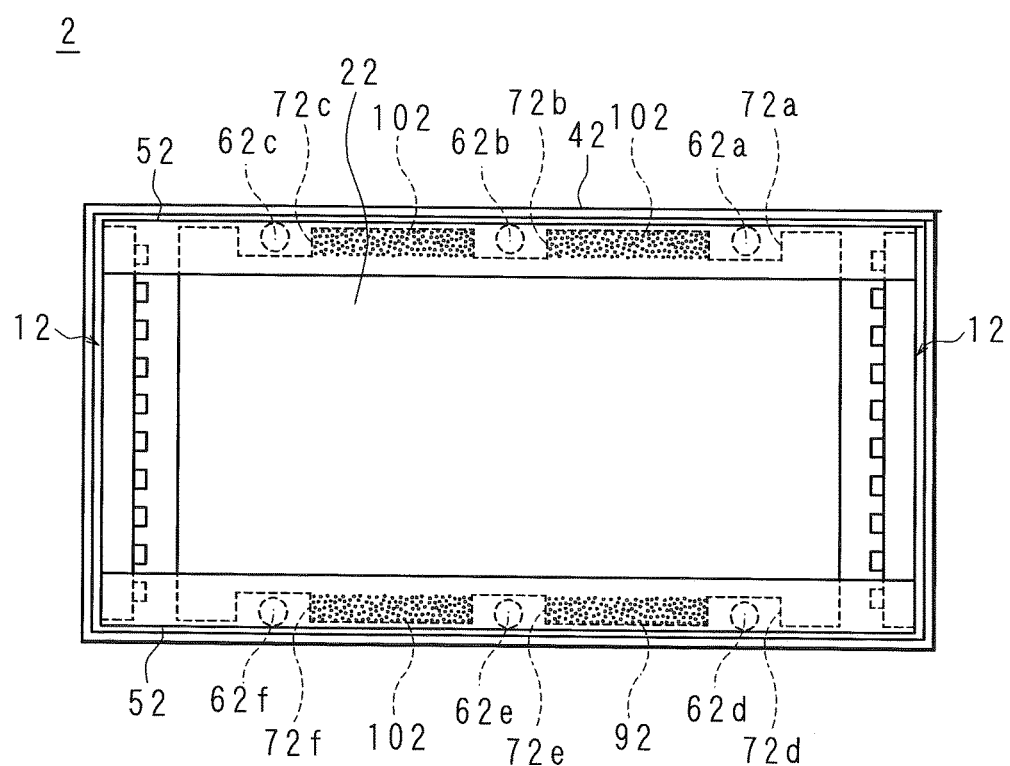
FIG. 8 is a schematic view describing a positional relation between the light source units and the notches of the light guide plate and reflection surfaces, in a liquid crystal television according to Embodiment 4 of the present invention.

FIG. 8 is a schematic view describing a positional relation between the light source units 12 and the notches 72 of the light guide plate 22 and the reflection surfaces 92, 92, . . . and 92, in the liquid crystal television 1 according to Embodiment 4 of the present invention.

As described above, the reflection surfaces 92, 92, . . . and 92 further uniformly reflects the light, which is emitted from the long-side edge parts of the light guide plate 22 toward the liquid crystal display panel 3, toward the long-side edge parts of the light guide plate 22 by the highly reflective dots 102, 102, . . . and 102, such that the luminance in the entirety of the long-side edge parts of the light guide plate 22 may be uniformly increased.

As a result, by suppressing the unevenness in luminance (bright-part) appearing in the vicinity of the side faces relating to the notches 72 of the light guide plate 22, the bright-part unevenness is no longer visible. Therefore, it is possible to solve the above-described problems and obtain good display quality, as well as, by narrowing the width W in the frame part 25, it is possible to expand the display window 15 (or the display region on which the image is displayed).

In the above description, the case in which the highly reflective dots 102, 102, . . . and 102 are printed in the area corresponding to the shape of the reflection surfaces 92, 92, . . . and 92 according to Embodiment 1 has been described, but the present invention is not limited thereto.

For example, it may be configured that the highly reflective dots 102, 102, . . . and 102 are printed in the area corresponding to the shape of the reflection surfaces 92, 92, . . . and 92 according to Embodiments 2 and 3.

In addition, the present invention is not limited to the above description, and it may be configured in such a manner that a dot density of the highly reflective dots 102, 102, . . . and 102 is gradually decreased toward the notches 72 of the light guide plate 22.

Thereby, when reflecting the light, which is emitted from the long-side edge parts of the light guide plate 22 toward the liquid crystal display panel 3, toward the long-side edge parts of the light guide plate 22, by decreasing the increment in the amount of light reflected by the reflection surfaces 92 in the vicinity of the notches 72, the increment in the amount of light reflected by the reflection surfaces 92 is increased with being farther away from the notches 72.

In addition, the present invention is not limited to the above description. The highly reflective dots 102, 102, . . . and 102 may be configured so as to have a constant distribution in the reflection surfaces 92, and each dot of the highly reflective dots 102, 102, . . . and 102 has a gradually decreased area toward the notches 72 of the light guide plate 22.

Thereby, when reflecting the light, which is emitted from the long-side edge parts of the light guide plate 22 toward the liquid crystal display panel 3, toward the long-side edge parts of the light guide plate 22, by decreasing the increment in the amount of light reflected by the reflection surfaces 92 in the vicinity of the notches 72, the increment in the amount of light reflected by the reflection surfaces 92 is increased with being farther away from the notches 72.

In addition, the present invention is not limited to the above description. It may be configured so that each dot of the highly reflective dots 102, 102, . . . and 102 in the reflection surfaces 92 has a constant shape (for example, a circular shape), and an interval between the dots of the highly reflective dots 102, 102, . . . and 102 is gradually increased toward the notches 72 of the light guide plate 22.

Thereby, when reflecting the light, which is emitted from the long-side edge parts of the light guide plate 22 toward the liquid crystal display panel 3, toward the long-side edge parts of the light guide plate 22, by decreasing the increment in the amount of light reflected by the reflection surfaces 92 in the vicinity of the notches 72, the increment in the amount of light reflected by the reflection surfaces 92 is increased with being farther away from the notches 72.

The same parts as those in Embodiment 1 will be denoted by the same reference numerals, and will not be described in detail.

Embodiment 5

Figure 9:
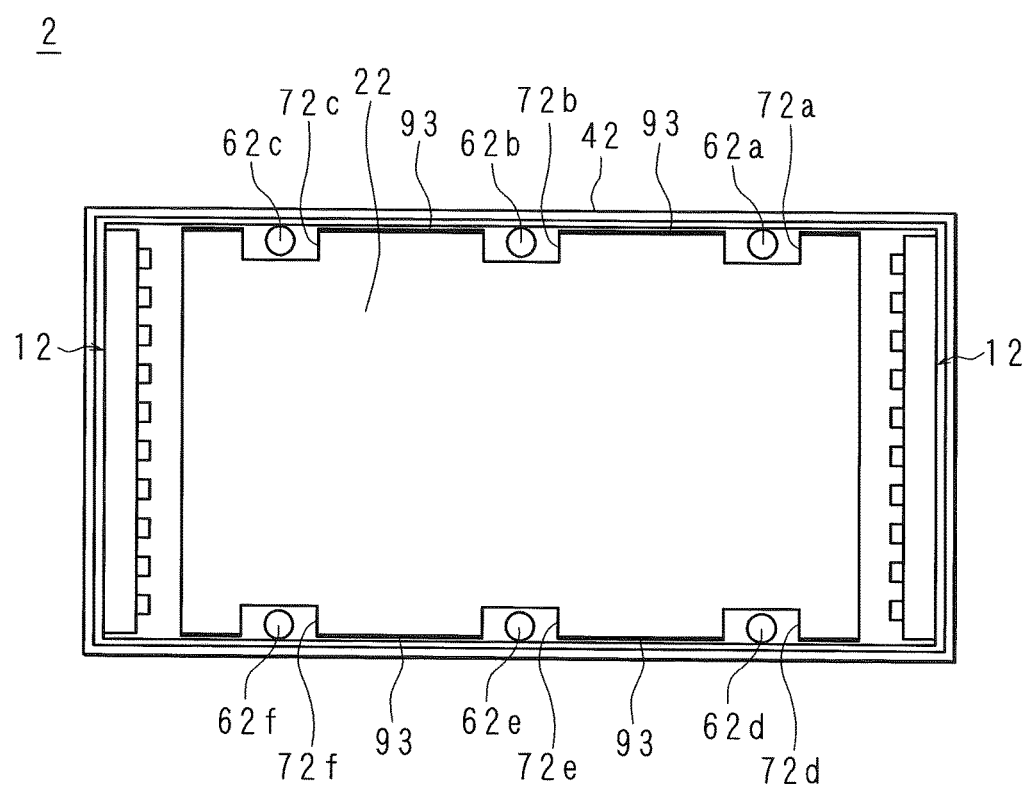
FIG. 9 is a schematic view describing a state in which the light source units and the light guide plate are housed in a back housing part, in a liquid crystal television according to Embodiment 5 of the present invention.

The present invention is not limited to the above description. FIG. 9 is a schematic view describing a state in which the light source units 12 and the light guide plate 22 are housed in the back housing part 42, in a liquid crystal television 1 according to Embodiment 5 of the present invention. For the convenience of explanation, the light guide plate pressing members 52 is not be illustrated.

As illustrated in FIG. 9, in the liquid crystal television 1 according to Embodiment 5 of the present invention, the side faces, which are the side faces of the light guide plate 22 and the side faces other than the side faces on the light source units 12 side and side face portions forming the notches 72a, 72b, 72c, 72d, 72e and 72f, have reflective sheets 93, 93, . . . and 93 attached thereto to reflect the light, which is emitted from the light source units 12 and is emitted through the side face of the light guide plate 22, to a direction opposite to the emission, that is, inside of the light guide plate 22.

Thereby, reflection of the light is performed by the side faces of the light guide plate 22 in the vicinity of the notches 72 to be reused. In addition, luminance of the center of the light guide plate 22 is increased, and thereby low power consumption may be achieved. Further, the light amount around the side faces of the notches 72 is increased, the unevenness in luminance (bright-part) appearing in the vicinity of the notches 72 is suppressed, and the bright-part unevenness is no longer visible. Therefore, it is possible to solve the above-described problems and obtain good display quality.

Embodiment 6

The present invention is not limited to the above description. Hereinafter, for the convenience of explanation, a case, in which the light source unit 12 facing any one side face of four side faces of the rectangular light guide plate 22 is provided, and one notch 72 is formed in the other side face facing to the one side face, will be described.

Figure 10:
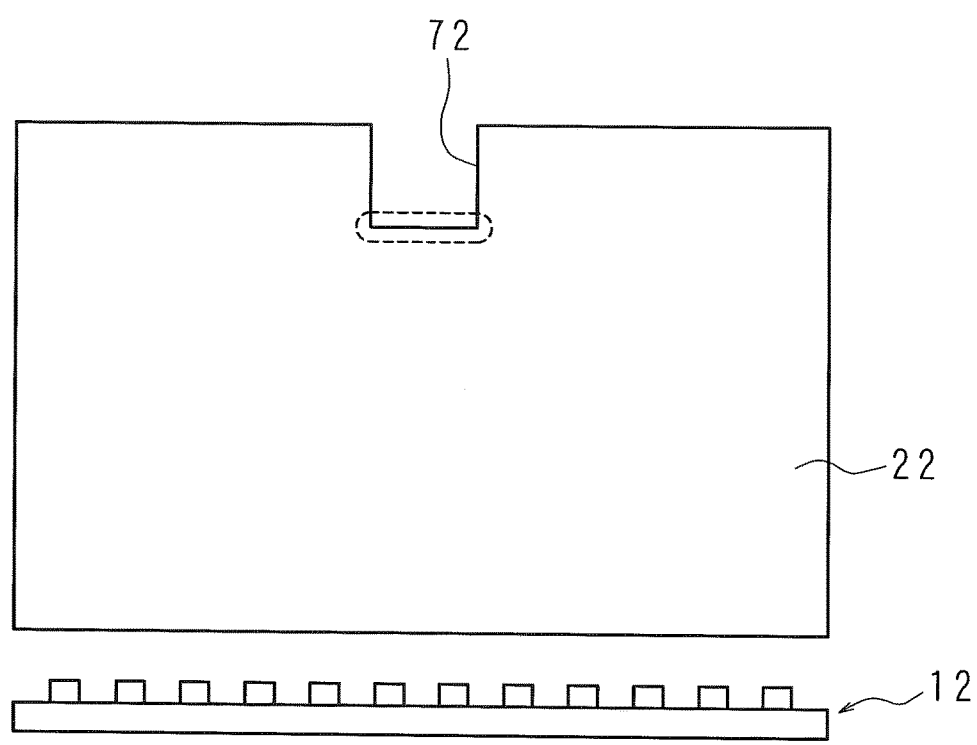
FIG. 10 is a schematic view describing a positional relation between the light source unit and a notch of the light guide plate, in a liquid crystal television according to Embodiment 6 of the present invention.

FIG. 10 is a schematic view describing a positional relation between the light source unit 12 and the notch 72 of the light guide plate 22, in a liquid crystal television 1 according to Embodiment 6 of the present invention.

In the liquid crystal television 1 according to Embodiment 6 of the present invention, the mirror-finishing is executed on a portion facing an incident direction of light from the light source unit 12 among side face portions forming the notch 72. In FIG. 10, such the mirror finished portion among the side face portions forming the notch 72 is illustrated by surrounding with a broken line.

Thereby, the irregular reflection on the portion facing the incident direction of the light from the light source unit 12 among the side face portions forming the notch 72 is suppressed, and the light amount on the notch 72 is decreased. Accordingly, the unevenness in luminance (bright-part) appearing in the vicinity of the side face of the notch 72 is suppressed, and the bright-part unevenness is no longer visible. Therefore, it is possible to solve the above-described problems and obtain good display quality.

Figure 11:
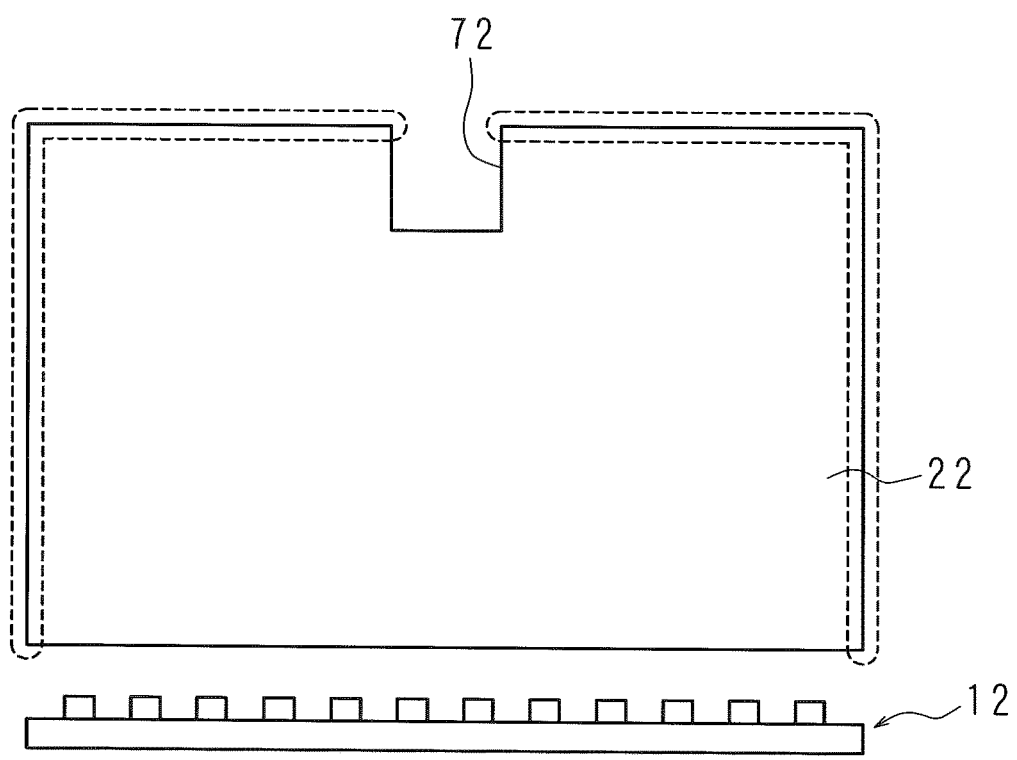
FIG. 11 is a schematic view describing the positional relation between the light source units and the notch of the light guide plate, in the liquid crystal television according to Embodiment 6 of the present invention.

In addition, the present invention is not limited to the above description. FIG. 11 is a schematic view describing the positional relation between the light source unit 12 and the notch 72 of the light guide plate 22, in the liquid crystal television 1 according to Embodiment 6 of the present invention.

In the liquid crystal television 1 according to Embodiment 6 of the present invention, the mirror-finishing is not executed on the side faces, which are the side faces of the light guide plate 22 and the side faces other than the side face on the light source units 12 side and the side face portions of the notch 72. In FIG. 11, such the non-mirror finished side faces are illustrated by surrounding with a broken line.

Thereby, the irregular reflection is generated at the side faces of the light guide plate 22 in the vicinity of the notch 72. Accordingly, the light amount around the side faces of the notch 72 is increased, the unevenness in luminance (bright-part) appearing in the vicinity of the side face of the notch 72 is suppressed, and the bright-part unevenness is no longer visible. Therefore, it is possible to solve the above-described problems and obtain good display quality.

It is noted that, as used herein and in the appended claims, the singular forms "a", "an", and "the" include plural referents unless the context clearly dictates otherwise.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A light source device comprising:
   a light source;
   a light guide plate comprising:
      (i) a first side-surface facing the light source,
      (ii) a front surface which has a rectangular shape, outputting light from the light source entered through the first side-surface,
      (iii) a rear surface opposite to the front surface, and
      (iv) a second side-surface not facing the light source and being vertical to both of the first side-surface and the front surface, wherein notches are formed at edge parts of the light guide plate along the second side-surface, not the first side-surface of the light guide plate; and
   a reflection sheet member which is disposed to face the rear surface of the light guide plate and has concave parts corresponding to the notches,
   wherein the light source device further comprises:
   a light guide plate pressing member extending in a longitudinal direction of the second side surface of the light guide plate and having a L-shaped cross-section orthogonal to the longitudinal direction, wherein the light guide plate pressing member comprises:
      (a) a wall part having a flat surface which is parallel to the second side surface of the light guide plate; and
      (b) a side plate protruding inward from a front edge of the wall part and covering a peripheral region of the front surface of the light guide plate, and
   wherein the light guide plate pressing member has a reflection surface on a rear surface of the side plate, and the reflection surface is formed at a portion other than positions corresponding to the notches of the light guide plate, in the facing direction in which the reflection sheet member and the light guide plate face each other
   with the proviso that the light source device does not comprise a member extending in a longitudinal direction of the first side surface of the light guide plate and covering a peripheral region of the front surface of the light guide plate.

2. The light source device according to claim 1, wherein the reflection surface is formed by attaching a reflection sheet to the reflection surface.

3. The light source device according to claim 1, wherein, in the second side-surface of the light guide plate, portions where the notches are not formed have reflective sheets attached thereto to reflect light emitted through the second side-surface of the light guide plate to a direction opposite to the emission.

4. The light source device according to claim 1, wherein the reflection surface is configured so that an area of the reflection surface is gradually decreased toward the light source.

5. The light source device according to claim 4, wherein the reflection surface is a substantially triangular shape.

6. The light source device according to claim 1, wherein the reflection surface is configured so that an area of the reflection surface is gradually decreased toward the notches of the light guide plate.

7. The light source device according to claim 6, wherein the reflection surface is a substantially rhombic shape.

8. The light source device according to claim 1, wherein highly reflective dots are printed on the reflection surface.

9. The light source device according to claim 8, wherein the reflection surface is configured so that a dot density of the highly reflective dots is gradually decreased toward the notches of the light guide plate.

10. The light source device according to claim 8, wherein the highly reflective dots have a constant distribution, and
the reflection surface is configured so that each area of the highly reflective dots is gradually decreased toward the notches of the light guide plate.

11. The light source device according to claim 8, wherein each dot of the highly reflective dots has a constant shape, and
the reflection surface is configured so that an interval between each dot of the highly reflective dots is gradually increased toward the notches of the light guide plate.

12. A display apparatus comprising:
the light source device according to claim 1; and
a display panel which is provided opposed to the front surface of the light guide plate, and displays an image using light entering through the light guide plate.

* * * * *